G. W. BAKER.
MACHINE FOR FLESHING, UNHAIRING, AND WORKING OUT HIDES AND SKINS.
APPLICATION FILED OCT. 19, 1910.

999,540.

Patented Aug. 1, 1911.

Witnesses
Stuart Hilder.
Francis M. Anderson.

Inventor
George W. Baker
by E. W. Anderson Jon
his Attorney

G. W. BAKER.
MACHINE FOR FLESHING, UNHAIRING, AND WORKING OUT HIDES AND SKINS.
APPLICATION FILED OCT. 19, 1910.

999,540.

Patented Aug. 1, 1911.
6 SHEETS—SHEET 2.

Witnesses
Stuart Hilder.
Frances M. Anderson.

Inventor
George W. Baker,
by E. W. Anderson & Son
his Attorneys

G. W. BAKER.
MACHINE FOR FLESHING, UNHAIRING, AND WORKING OUT HIDES AND SKINS.
APPLICATION FILED OCT. 19, 1910.

999,540.

Patented Aug. 1, 1911.
6 SHEETS—SHEET 4.

Fig. 4.

Witnesses
Stuart Hilder.
Frances M. Anderson.

Inventor
George W. Baker
by E. W. Anderson
his Attorneys

G. W. BAKER.
MACHINE FOR FLESHING, UNHAIRING, AND WORKING OUT HIDES AND SKINS.
APPLICATION FILED OCT. 19, 1910.

999,540.

Patented Aug. 1, 1911.

Inventor
George W. Baker
by E. W. Anderson & Son
his Attorneys

Witnesses
Stuart Hilder
Frances M. Anderson

UNITED STATES PATENT OFFICE.

GEORGE W. BAKER, OF WILMINGTON, DELAWARE, ASSIGNOR TO G. W. BAKER MACHINE COMPANY, OF WILMINGTON, DELAWARE, A CORPORATION.

MACHINE FOR FLESHING, UNHAIRING, AND WORKING OUT HIDES AND SKINS.

999,540.  Specification of Letters Patent.  Patented Aug. 1, 1911.

Application filed October 19, 1910. Serial No. 587,964.

*To all whom it may concern:*

Be it known that I, GEORGE W. BAKER, a citizen of the United States, resident of Wilmington, in the county of Newcastle and State of Delaware, have made a certain new and useful Invention in Machines for Fleshing, Unhairing, and Working Out Hides and Skins; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to machines for fleshing, unhairing and working out hides and skins, embodying certain improvements upon the machine of my Patent Number 811,359, dated January 30, 1906; and it consists in the novel construction and combinations of parts as hereinafter set forth.

One object of the invention is to provide means for fleshing a hide or skin as nearly clean as possible, with one passage thereof through the machine. Hides are always of more or less uneven thickness, bull hides being thin upon the back of the animal and thicker at the belly portion, while steers have hides of more even thickness, but slightly thinner at the belly portions. The fleshing is done in most cases after the hide is divided in two through the center, and it is these bull and steer hides that are designed to be cleaned by one passage thereof through the machine.

In the accompanying drawings, illustrating the invention.

In these drawings the numeral 1 designates the machine frame, having end standards 2, 2, longitudinally braced at 3. Upon these end standards are bolted the upper frames 4, 4, in which the cutter roll 5 is journaled, the frames 5ª hinged to these upper frames carrying the feed rolls 6 and 7, and the rubber covered bed roll 8 having supports in movable arms to be hereinafter described.

Upon the end standards at the rear of the machine is journaled the longitudinal crank shaft 9, carrying a large spur gear wheel 10, arranged to operate in connection with suitable stopping and starting mechanism hereinafter referred to. Below the crank shaft is mounted upon the end standards a longitudinal shaft 11, carrying at one end thereof a large sprocket wheel 12, and at its opposite end a pinion 13, in mesh with the spur gear 10, said pinion having a clutch-toothed hub 14, arranged for engagement with a slidable clutch member 15, upon the same shaft.

Figure 10:
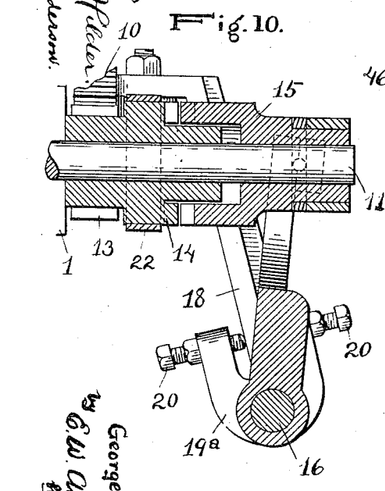
Fig. 10 is a detail central longitudinal section of the clutch mechanism and adjacent parts.

Upon a rock shaft 16, at one end of the machine, extending at right angles to the pinion shaft 11, is an arm 17, engaging the clutch member 15, and designed to make or release the clutch thereof with said pinion. A trip arm 18 is loosely mounted upon the shaft 16, adjustment of the trip arm pivotally upon its shaft with relation to cams 19, 19, located diametrically opposite to each other upon the outer face of the spur wheel 10, being provided for by means of a sleeve 19ª, fast upon said rock shaft, and carrying set screws 20, 20, located upon opposite sides of said trip arm, this adjustment being for the purpose of providing for such compensation as may be needed owing to wear of the cams. The trip arm has at its upper inturned end, an anti-friction roller 21, which bears upon one of the cams before the machine is started, and upon the opposite cam when the machine is brought to rest, said trip arm being thus thrown outward by the cams to operate the rock shaft and release the pinion clutch, and being allowed to move toward the pinion to make the clutch.

Figures 5, 6, 7, 8, 9:
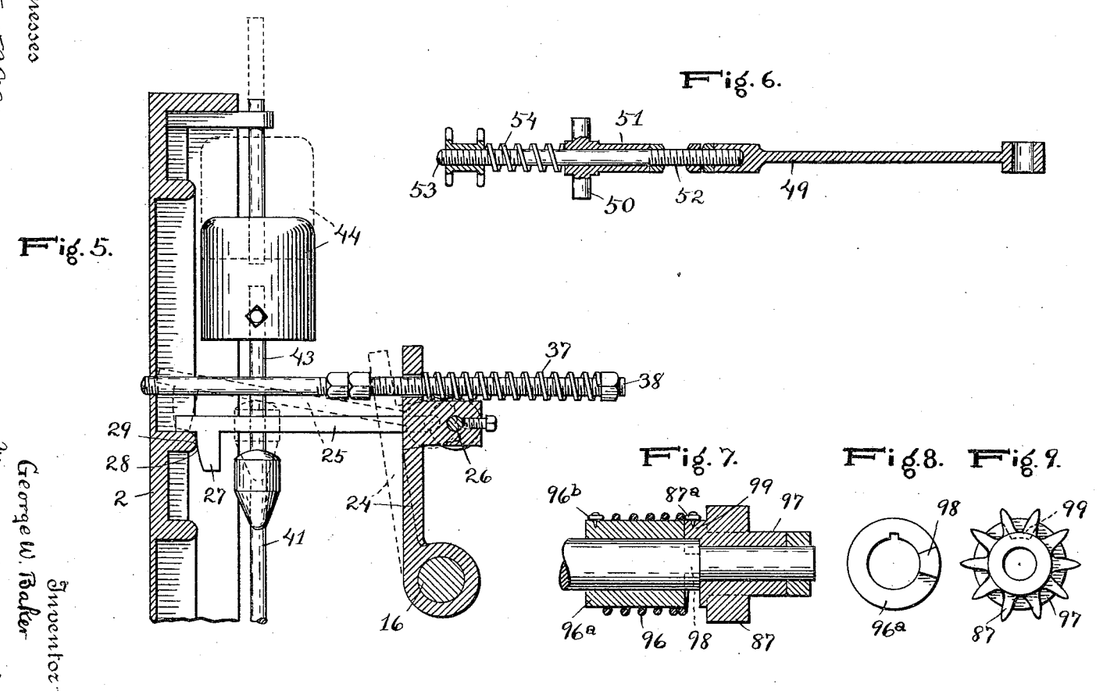
Fig. 5 is a detail side view partly broken away of the latch mechanism and adjacent parts.
Fig. 6 is a detail central longitudinal section of one of the connecting rods between the crank shaft and the bed roll.
Fig. 7 is a detail central longitudinal section of the spring connection between the upper feed roll and its driving pinion.
Fig. 8 is a detail end view of the upper feed roll hub or end portion.
Fig. 9 is a similar view of the pinion for this feed roll.

For the purpose of keeping the slidable clutch member separated from the clutch hub of the pinion when the clutch is released, an arm 24 is carried by the rock shaft, a latch arm 25 having pivotal connection with the arm 24 at 26, and a depending projection 27, arranged to abut against the frame at 28, when the latch drops to rest upon the frame at 29.

The treadle 31, has its carrying arm 32, mounted upon a rock shaft 33, and arm 33ª fast upon said shaft and movable therewith, having at its rear end a pivotal connection at 34, with the lower end of an upwardly and rearwardly extending push arm 35, designed for operative engagement with pins 36, 36, located diametrically opposite upon the inner face of the spur gear 10, whereby when the treadle is depressed, this push arm will be caused to move upward and through its engagement with one of said pins to push the wheel 10 around sufficiently to move the cam away from and out of engagement with the roller of the trip arm, which is thereupon thrown inward to make the clutch with the pinion, by means of a coiled spring 37, surrounding a bolt or rod 38, connecting the upper end of the arm 24 with the end standard. The spur wheel 10 having been turned one half around, the opposite cam 19 will be brought into engagement with the roller of the trip arm, which will thereby be pressed outward against the tension of the spring 37 to release the pinion clutch, the opposite pin 36 at the same time moving into its seat 40 in the upper end of the push arm 35. When the treadle is again depressed, the pinion clutch is again made and released in the same manner, each operation of the treadle allowing the spur wheel to turn 180 degrees. As the clutch is released, the movable clutch member will be slid to leave a small space between the two clutch members, when the latch drops automatically, and locks the clutch members apart until the treadle is again operated. Simultaneously with the depression of the treadle, the latch 25 is lifted to allow the pinion clutch to be made by engagement therewith of a vertical arm 41, pivoted to the arm 33 at 42. The latch lifter 41 has an upward extending rod connection 43, forming a rigid part thereof, and moving therewith, said rod carrying a counterweight 44, whereby when the treadle is released, the counterweight will depress the latch lifter, and through its connection with the arm 33, restore the treadle to normal position.

Figure 11:
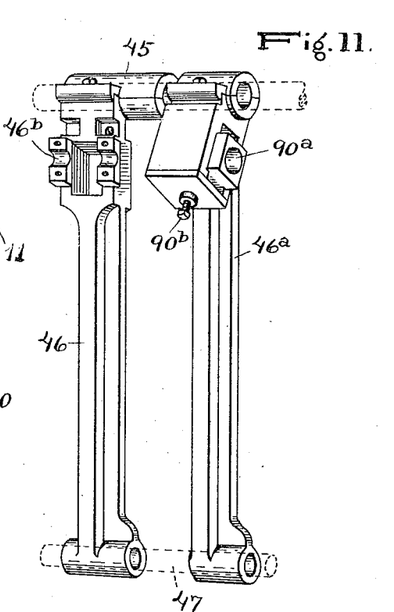
Fig. 11 is a detail perspective view of the upright bed-roll and supporting-roll carrying-arms at one end of the machine.

The rubber covered bed roll is journaled in boxes 45, at the upper ends of long carrying arms 46, 46, located just without the standards at each end of the machine, and having at their lower ends pivotal connection with short shafts 47, 47, the bed roll journals having extension through and movement forward and back within openings 48, 48, of the upper frames 4, 4, admitting of movement of the bed roll forward for placing the hide thereupon, and backward to cause the bed roll to press the hide against the cutter roll for fleshing purposes. The movement of these long carrying arms 46, 46, and of the bed roll is accomplished by means of connecting rods 49, 49, having at their rear ends pivotal connection with cranks 9ª, 9ª of the crank shaft, and at their forward ends pivotal connection 50 with said carrying arms. Each arm 46 and its connecting rod are joined by means of a rod 52, having screw threaded engagement at one end thereof with the connecting rod and at its opposite end sliding engagement with a block 51, said block having pivotal bearings in the arm 46 at 50, and said rod 52 being extended forward past the pivot block at 53, a strong coiled spring 54 surrounding the forward part of the rod and bearing at its rear end against the pivot block. Suitable nuts are provided upon the rod 52, to adjust the tension of the coiled spring, and the arms 46, being pivotally mounted at their lower ends, slight rearward movement of said arms and of the bed roll carried thereby against the tension of the coiled springs is allowed, to cushion the bed roll in its action against the cutter roll.

In order that the spur wheel 10 may be steadied when passing to its center or position of rest, when the crank and connecting rod are in line, and to prevent any creeping of the crank backward or forward of its position of rest, a friction band 22, has engagement with the clutch-toothed hub of the pinion, the ends of said band being made fast to the frame at 23, and the band being capable of adjustment to vary the pressure thereof or to compensate for wear by means of a bolt 22ª connecting the band ends, and having suitable adjustment nuts. This is particularly desirable as the strong coiled spring at the forward end of the connecting rod, in case said rod is not quite on center at the position of rest, would pull the crank to one side or the other, were it not for this friction check, when the pressure of the spring would be loosened, and the work imperfectly done.

Figure 12:
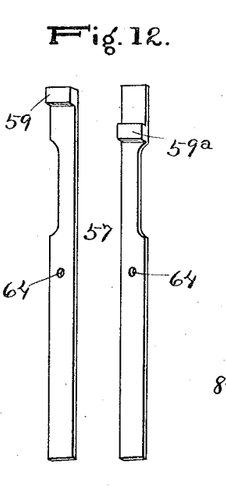
Fig. 12 is a similar view of the vertical reciprocatory bars at the two ends of the machine.

For the purpose of throwing the bed roll out of parallel relation or at an angle to the cutter roll, when required for the right and left hand sides or halves of the hide, to make a tapered cut thereupon as before explained, a vertical reciprocatory bar 57, is provided at each end of the machine, said bar having sliding bearings in the frame at 58, and at its upper end a forward projection 59, upon which a set screw 60 having threaded engagement with a long bed roll carrying arm 46, has an end bearing. Thus when the bar 57 is moved endwise, the arm 46, at one end of the machine will be moved forward with the bed roll carried thereby, said bed roll moving in a substantially horizontal direction upon its opposite end as a center slightly away from the cutter roll, the journal bearings of the bed roll in the arms 46, 46, being sufficiently loose to allow the slight lateral movement of the journals in their bearings required. In this way a slightly tapered interval is left between the bed roll and the cutter roll, which will cause a tapered cut to be made upon a hide of uneven thickness. Normally the bed roll and the cutter roll are in exactly parallel relation, for use with the skins of calves and with kips, or other small skins, which are not divided in halves, being of more even thickness. The set screw 60 at one end of the machine is normally located below and out of engagement with the projection of the sliding bar at such end, and the set screw 60$^a$ at the opposite end of the machine just above and out of engagement with the projection 59$^a$ of the sliding bar at this end, whereby an upward movement of the sliding bars, which work together, will throw the bed roll out at one end thereof, and a downward movement of the sliding bars will throw the bed roll out at its opposite end, according to the direction in which the tapered cut is to be made, for the right or the left hand half or side of the hide. This movement of the sliding bars is brought about by means of levers 61, fulcrumed upon a shaft 62, said levers having each an inner arm 63 having at its rear end engagement with a perforation 64 of the sliding bar, a coiled spring 65 surrounding a reduced portion of the arm 63, and being located between the sliding bar and a shoulder 66 of said arm. The levers 61, are provided with a cross handle connection 66$^a$, which is thrown upward or downward by the workman according to the character of the cut to be made or the side of the hide to be operated upon.

Figure 1:
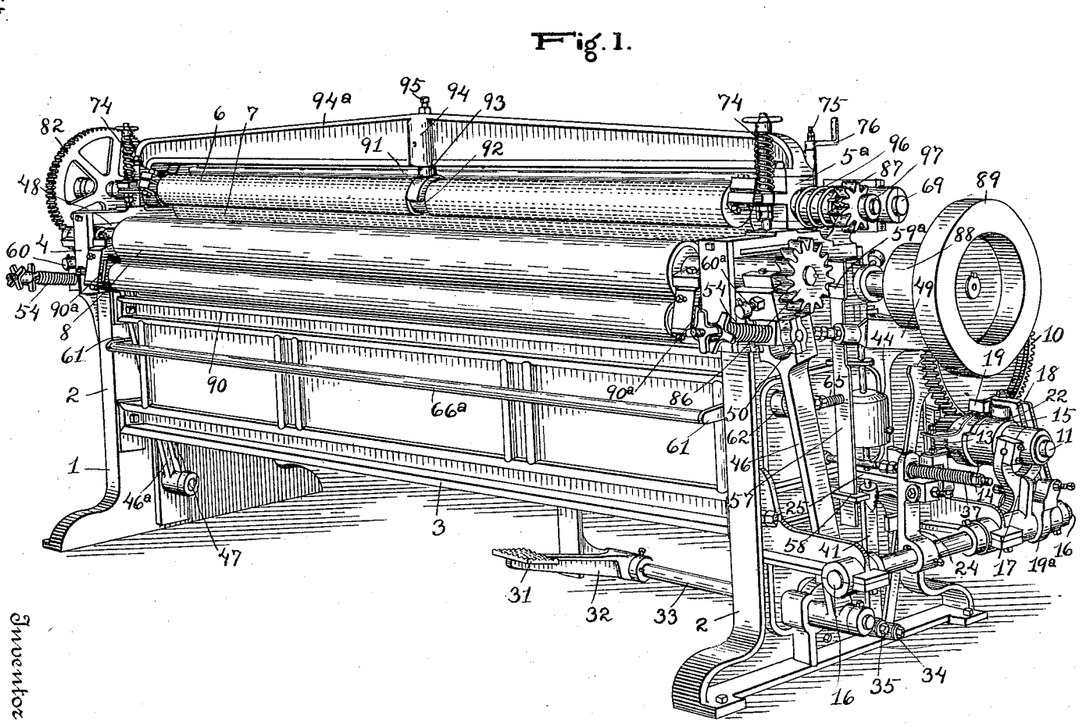
Figure 1 is a perspective view of my machine.
Figure 2:
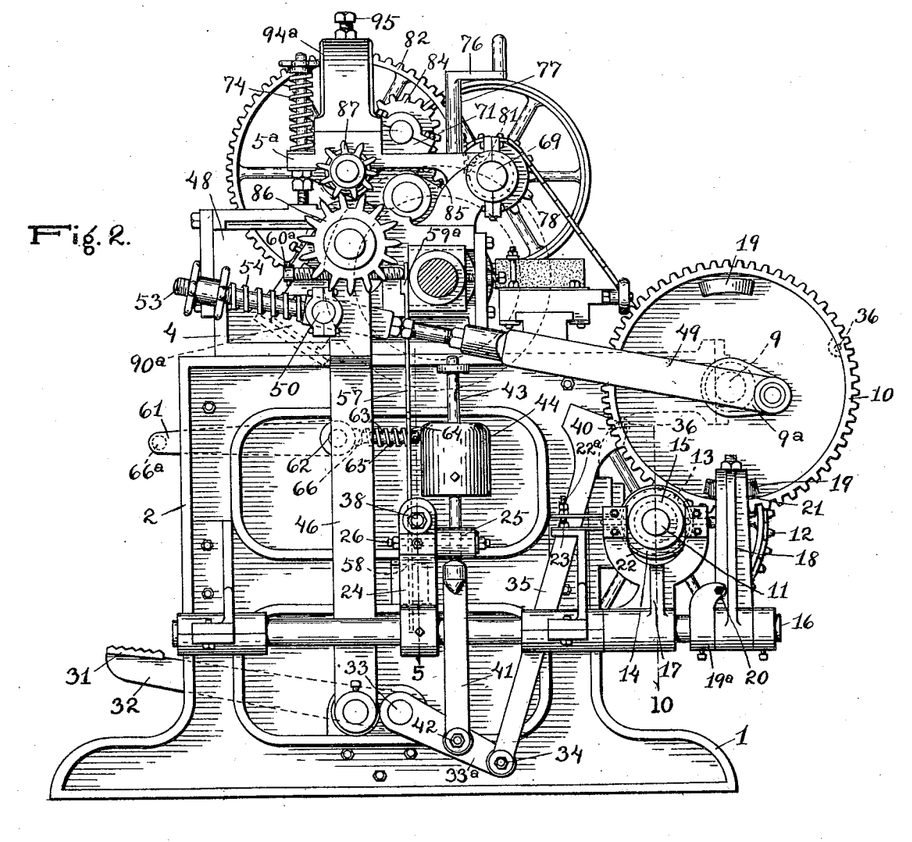
Fig. 2 is an end view of the same.
Figure 3:
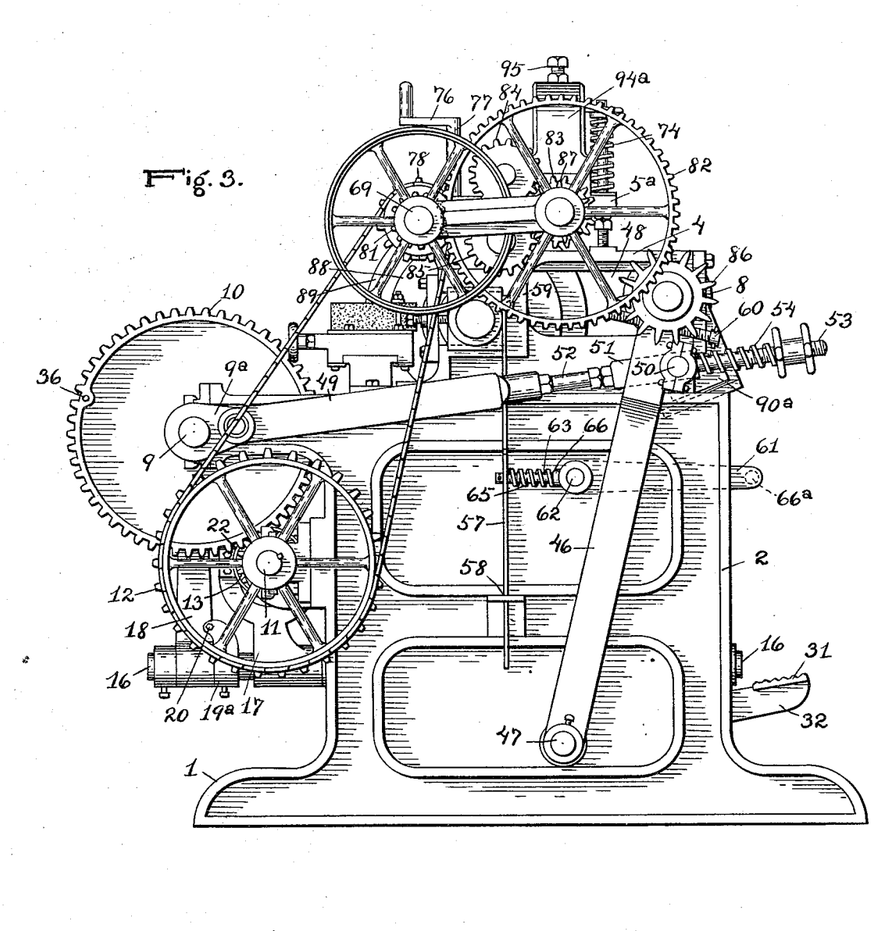
Fig. 3 is a similar view taken from the opposite end of the machine.
Figure 4:
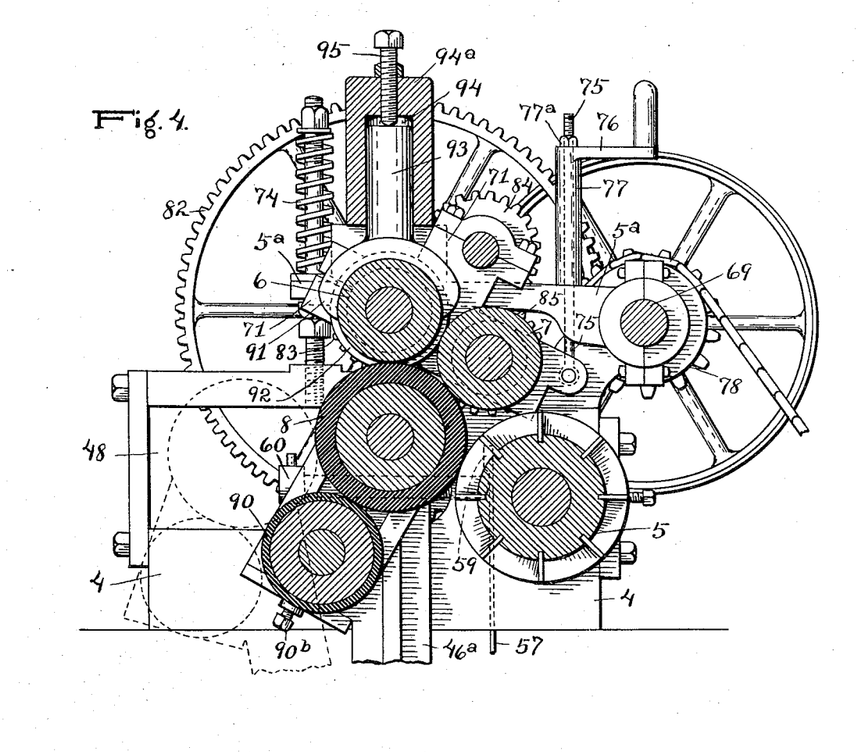
Fig. 4 is a central vertical section of the upper part of the machine.

The frame 5$^a$ at each end of the machine is hinged at its rear end to a longitudinal shaft 69, a boxing frame 71 at each end of the machine being pivoted upon the forward feed roll shaft, which is journaled in the hinged frames 5$^a$, at the forward ends thereof, said boxing frames having journaled therein at the rear ends thereof the rear feed roll, and said hinged frames having at their forward ends a spring compression device 74, for pressing the feed rolls downward in a yielding manner against the bed roll, the boxing frames having at their rear ends each an adjustable pivotal rod connection 75, said rod having adjustment upward or downward by means of a lever 76, the hub 77 of which has threaded engagement with the upper end of each rod 75. Thus upon turning said lever, the rod will be moved endwise to vary the space or interval between the rear feed roll and the bed roll, this adjustment being secured by means of a nut or nuts 77$^a$.

In order to prevent any central spring or give of the bed roll when under the strain of the fleshing process and to maintain the bed roll in proper operative relation at all parts thereof to the cutter roll, a supporting roll 90 is journaled in boxes 90$^a$ in the upper ends of long carrying arms 46$^a$, 46$^a$, located at each end of the machine just within the end standards and pivoted at their lower ends to the short shafts 47 aforesaid, upon which the arms 46 are also mounted, both pairs of carrying arms being oppositely located at each end of the machine and working in unison. The bed roll is also provided with journal bearings in the upper ends of the arms 46$^a$, both pairs of arms moving together as stated, and the supporting roll being located in permanent contact with the lower portion of the bed roll throughout its length and moving therewith when the bed roll is thrown into and out of operative relation to the cutter roll. The boxes for the journals of the supporting roll are provided with a sliding adjustment in their seats to compensate for wear, set screws 90$^b$ being provided to fix this adjustment. For the purpose of preventing any upward spring or give centrally of the forward feed roll for the same reason, a central arc-form resistance block 91 has bearings in a central shallow annular groove 92 of this feed roll, the block 91 having a stem 93 seated at 94 in a longitudinal brace bar 94$^a$ connecting the hinged frames 5$^a$, said stem having a set screw 95 bearing thereupon for purpose of adjustment. The top brace 94$^a$ connects and braces the hinged frames, and also provides a means of connection for the resistance block.

The upper or forward feed roll has a coiled spring 96 surrounding a hub 96$^a$ at one end thereof, said spring being fastened at one end to said hub at 96$^b$ and at its opposite end to the pinion 87 at 87$^a$, both said hub and said pinion having each a single lug, designated 98 and 99 respectively, and substantially three fourths of a revolution of the pinion being required before the two lugs are brought into engagement to rotate the bed roll through movement of said pinion, the coiled spring acting to return the hub and its lug to normal position. Thus as the pinion 86 upon the bed roll is turned by engagement therewith of the pinion 87 upon the feed roll when the machine is in operation, it is retarded by the spring until the driver lug shall have made three quarters of a revolution, and then and not before the bed roll will begin to turn. In this way the skin is not fed to the machine until it reaches the cutting cylinder, which is of particular advantage in fleshing small skins.

Figure 13:
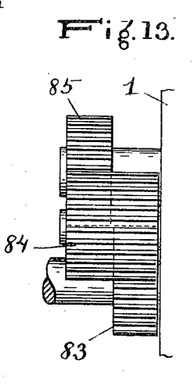
Fig. 13 is a detail side view of the gear connection between the two feed rolls.

The large sprocket wheel 12 upon the pinion shaft 11 has a chain connection with a small sprocket wheel 78 upon the shaft 69, which is the driving shaft for the feed rolls and the bed roll and is in constant rotation, this driving shaft having a pinion 81 in mesh with a large spur gear 82 upon the shaft of the upper feed roll, said shaft also carrying a small spur gear 83 in mesh with an intermediate spur gear 84 having driving engagement with a small spur gear 85 upon the shaft of the lower or rear feed roll. When the bed roll is thrown rearward into operative relation to the cutter roll, the pinion 86 upon the bed roll shaft is brought into mesh with the pinion 87 upon the shaft of the upper or forward feed roll, to rotate the bed roll, which is retarded in its action as before stated. When the bed roll is thrown forward, this pinion engagement is released, and the bed roll is no longer turned. The cutter roll shaft, which is also in constant rotation, is provided with a driving pulley 88, and a fly wheel 89, which may form a part of the driving pulley, being so shown.

Having thus described my invention, what I claim as new and desire to secure by Letters Patent is:

1. In a machine of the character described, the combination with a cutter roll member, a bed roll member, automatic means for moving the bed roll member toward and away from the cutter roll member, a clutch in connection with said automatic means, automatic means for releasing said clutch to intermittently stop the bed roll member, and means for causing the engagement of the clutch, of means for adjusting one of the members away from and out of parallel with relation to the other member.

2. In a machine of the character described, the combination with a cutter roll, a bed roll, automatic means for moving the bed roll toward and away from the cutter roll, a clutch in connection with said automatic means, automatic means for releasing said clutch to intermittently stop the bed roll, and means for causing the engagement of the clutch, of means for adjusting the bed roll away from and out of parallel with relation to the cutter roll.

3. In a machine of the character described, the combination with a cutter roll, a bed roll, automatic means for moving the bed roll toward and away from the cutter roll, a clutch in connection with said automatic means, automatic means for releasing the clutch to intermittently stop the bed roll, and pedal and spring-operated means for causing the engagement of the clutch members, of manually operated means for adjusting said bed roll away from and out of parallel with relation to the cutter roll.

4. In a machine of the character described, the combination with a cutter roll, a bed roll, pressure springs therefor, automatic means for moving the bed roll toward and away from the cutter roll, a clutch in connection with said automatic means, automatic means for releasing said clutch to intermittently stop the bed roll, and means for causing the engagement of the clutch, of means for adjusting the bed roll against the tension of one of said springs away from and out of parallel with relation to the cutter roll.

5. In a machine of the character described, the combination with a cutter roll, a bed roll, automatic means for moving the bed roll toward and away from the cutter roll, a clutch in connection with said automatic means, automatic means for releasing the clutch to intermittently stop the bed roll, and pedal and spring operated means for causing the engagement of the clutch members, of manually operated means capable of movement in opposite directions to adjust said bed roll at either end thereof away from and out of parallel with relation to the cutter roll.

6. In a machine of the character described, the combination with a cutter roll, pivoted arms, a bed roll carried thereby, a crank shaft, connecting arms between said shaft and said pivoted arms, pressure springs for the bed roll, a clutch operating in connection with said shaft, automatic means for releasing the clutch to intermittently stop the bed roll, and coacting pedal and spring operated means for causing the engagement of the clutch members, of means for adjusting said bed roll against the tension of one of said springs away from and out of parallel with relation to the cutter roll.

7. In a machine of the character described, the combination with a cutter roll, pivoted arms, a bed roll carried thereby, a crank shaft, connecting arms between said shaft and said pivoted arms, a clutch operating in connection with said shaft, automatic means for releasing said clutch to intermittently stop the bed roll, and coacting pedal and spring-operated means for causing the engagement of the clutch members, of a slidable bar having a projection adapted for engagement with one of said pivoted arms to adjust said bed roll when adjacent to the cutter roll away from and out of parallel with relation thereto.

8. In a machine of the character described, the combination with a cutter roll, pivoted arms, a bed roll carried thereby, a crank shaft, connecting arms between said shaft and said pivoted arms, a clutch operating in connection with said shaft, automatic means for releasing said clutch to intermittently stop the bed roll, and coacting pedal and spring-operated means for causing the engagement of the clutch members, of reciprocatory bars having upper and lower projections adapted for engagement with either of said pivoted arms to adjust said bed roll when adjacent to the cutter roll oppositely away from and out of parallel with relation thereto, and a hand-lever device for moving said bars.

9. In a machine of the character described, the combination with a cutter roll and a bed roll having pivoted carrying arms, of a slidable bar having a projection adapted for engagement with one of said carrying arms to accomplish an angular adjustment of the bed roll with relation to the cutter roll.

10. In a machine of the character described, the combination with a cutter roll, pivoted arms, a bed roll carried thereby, and pressure springs for said bed roll, of a reciprocatory bar having a projection adapted for engagement with one of said pivoted arms to press the bed roll at one end thereof away from the cutter roll against the tension of its spring.

11. In a machine of the character described, the combination with a cutter roll, pivoted arms, a bed roll carried thereby, and pressure springs for the bed roll, of reciprocatory bars having upper and lower projections adapted for engagement with either of said pivoted arms to accomplish an angular adjustment of the bed roll at either end thereof against the tension of its spring with relation to the cutter roll.

12. In a machine of the character described, the combination with a cutter roll, pivoted arms, a bed roll carried thereby, pressure springs for said bed roll, and set screws carried by said pivoted arms, of reciprocatory bars having projections adapted for engagement with either of said set screws to accomplish an angular adjustment of the bed roll at either end thereof against the tension of its spring with relation to the cutter roll.

13. In a machine of the character described, the combination with a cutter roll, pivoted arms, a bed roll carried thereby, pressure springs for said bed roll and set screws carried by said pivoted arms, of reciprocatory bars having projections adapted for engagement with the set screw of either of said pivoted arms to accomplish an angular adjustment of the bed roll with relation to the cutter roll, and a lever device for operation of said bars.

14. In a machine of the character described, a cutter roll, a bed roll, pivoted carrying arms for said bed roll, and reciprocatory means having engagement with one of said carrying arms to accomplish an angular adjustment of the bed roll with relation to the cutter roll, in combination with a supporting roll also carried by said pivoted arms and located below and in contact with the bed roll.

15. In a machine of the character described, a cutter roll, inner and outer pivoted arms at each end of the machine, a reciprocatory bed roll carried by said pivoted arms, reciprocatory means having engagement with one of said pivoted arms to accomplish an angular adjustment of the bed roll with relation to the cutter roll, in combination with a supporting roll carried by the inner of said pivoted arms and located below and in contact with the bed roll.

16. In a machine of the character described, a cutter roll, a bed roll, pivoted carrying arms at the ends of the machine for said bed roll, and reciprocatory bars having upper and lower projections adapted for engagement respectively with either of said pivoted arms to accomplish an angular adjustment of the bed roll at either end thereof with respect to the cutter roll, in combination with a supporting roll carried by said pivoted arms and located below and in contact with the bed roll.

17. In a machine of the character described, a cutter roll, a feed roll, a bed roll, pivoted carrying arms for said bed roll, reciprocatory means having engagement with one of said pivoted arms to accomplish an angular adjustment of the bed roll with relation to the cutter roll, in combination with a supporting roll also carried by said pivoted arms and located below and in contact with the bed roll, and a resistance device located above and in contact with said feed roll.

In testimony whereof I affix my signature, in presence of two witnesses.

GEORGE W. BAKER.

Witnesses:
FRANCIS J. McNULTY,
VITO MARIELLO.

---

Copies of this patent may be obtained for five cents each, by addressing the "Commissioner of Patents, Washington, D. C."